US006802355B2

(12) United States Patent
Kline et al.

(10) Patent No.: US 6,802,355 B2
(45) Date of Patent: Oct. 12, 2004

(54) OVERCOAT APPLICATION PEEL APPARATUS

(75) Inventors: Daniel Steven Kline, Encinitas, CA (US); James Mason, Webster, NY (US); Robert John Rosati, Carlsbad, CA (US); Mark Steven Janosky, Rochester, NY (US); James Arthur Larrabee, Rochester, NY (US); Stephen Paul Lolacono, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 215 days.

(21) Appl. No.: 10/038,792

(22) Filed: Dec. 31, 2001

(65) Prior Publication Data

US 2003/0121617 A1 Jul. 3, 2003

(51) Int. Cl.[7] .................................... B32B 35/00
(52) U.S. Cl. ........................ 156/584; 156/238; 156/344
(58) Field of Search ................................ 156/344, 584, 156/238

(56) References Cited

U.S. PATENT DOCUMENTS

| | | | | |
|---|---|---|---|---|
| 3,932,258 | A | | 1/1976 | Brinkman et al. |
| 4,060,441 | A | * | 11/1977 | Ohta et al. .................. 156/234 |
| 4,083,838 | A | | 4/1978 | Breher |
| 5,321,480 | A | | 6/1994 | Merle et al. |
| 5,349,424 | A | | 9/1994 | Dalal et al. |
| 5,410,394 | A | | 4/1995 | Wayman et al. |
| 5,418,105 | A | | 5/1995 | Wayman et al. |
| 5,483,331 | A | | 1/1996 | Wayman et al. |
| 5,643,392 | A | | 7/1997 | Clough |
| 5,658,416 | A | | 8/1997 | MacCollum et al. |
| 5,666,592 | A | | 9/1997 | Aslam et al. |
| 5,666,623 | A | | 9/1997 | Yamada et al. |
| 5,709,973 | A | | 1/1998 | Chen et al. |
| 5,783,348 | A | | 7/1998 | Tyagi et al. |
| 5,788,384 | A | | 8/1998 | Goodwin et al. |

(List continued on next page.)

FOREIGN PATENT DOCUMENTS

| | | | |
|---|---|---|---|
| JP | 1182055 | | 7/1989 |
| JP | 1182081 | | 7/1989 |
| JP | 2121886 | | 5/1990 |
| JP | 2000-313097 | * | 11/2000 |
| JP | 2002283553 | | 10/2002 |

*Primary Examiner*—Mark A. Osele
(74) *Attorney, Agent, or Firm*—Frank Pincelli

(57) ABSTRACT

An overcoat application apparatus is used to transfer an overcoat material from a donor to a printed media. The overcoat application apparatus in this case includes a donor supply reel, a donor guide bar, a heated fuser guide, a pressure guide, an overcoat application peel apparatus, and a donor take-up reel. The donor supply reel provides a continuous source of donor plus overcoat material. The donor guide bar guides printed media and the donor plus overcoat into a nip created by forcing the heated fuser guide and pressure guide together. The heated fuser guide is used to transport the printed media and laminate carrying donor through the nip and apply heat to the laminate carrying donor and printed media. The pressure guide is used to apply pressure to the fuser guide in order to produce the mechanical nip. The nip plus the heat causes the overcoat material on the donor to be transferred to the printed media. After the fusing process, the peel bar is used to separate the support layer of the laminate carrying donor from the printed media that is now coated with the overcoat material. The overcoat application peel apparatus has three features that aid in the overall ability to perform the separation of the donor layer from the overcoated printed media. These are the first peel guide, the second peel guide and the take-up platen.

16 Claims, 4 Drawing Sheets

U.S. PATENT DOCUMENTS 5,807,461 A * 9/1998 Hagstrom .................. 156/361
5,809,032 A 9/1998 Weeber et al.
5,820,277 A 10/1998 Schulte
5,825,392 A * 10/1998 Mochizuki ................. 347/197
5,887,235 A 3/1999 Wayman et al.
5,890,032 A 3/1999 Aslam et al.
5,893,666 A 4/1999 Aslam et al.
5,895,153 A 4/1999 Aslam et al.
5,897,249 A 4/1999 Aslam et al.
5,909,810 A 6/1999 Aslam et al.
6,022,429 A * 2/2000 Hagstrom .................... 156/84
6,053,648 A 4/2000 Mistyurik
6,110,316 A * 8/2000 Kobayashi et al. ......... 156/230
6,198,902 B1 3/2001 Vaughan et al.
6,246,858 B1 6/2001 Condello et al.
6,261,012 B1 * 7/2001 Haas et al. ................. 400/208
6,263,181 B1 7/2001 Vaughan et al.
6,500,291 B1 * 12/2002 Okada et al. ............... 156/230
6,554,044 B2 * 4/2003 Paulson et al. ............. 156/540
6,585,366 B2 * 7/2003 Nagata et al. .............. 347/101

* cited by examiner

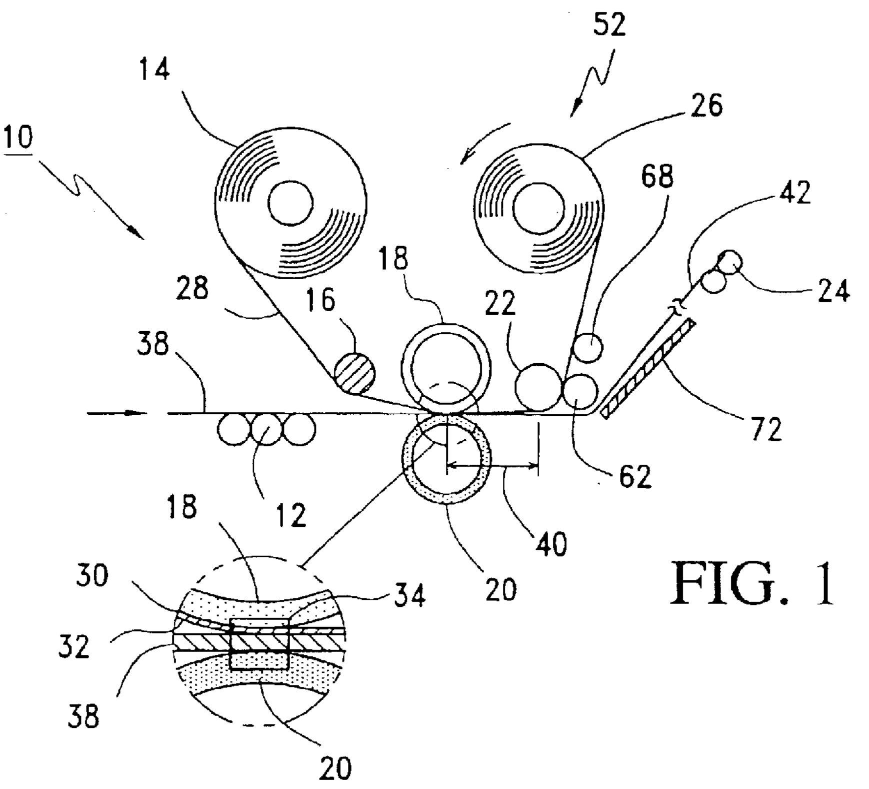
FIG. 1
FIG. 2
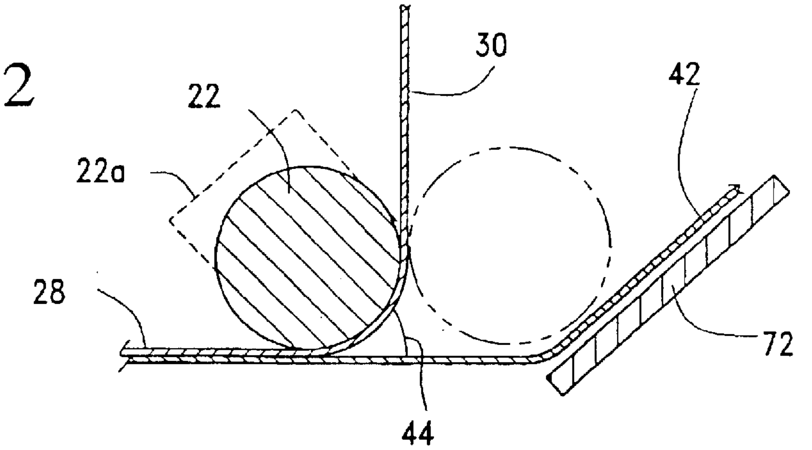
FIG. 3
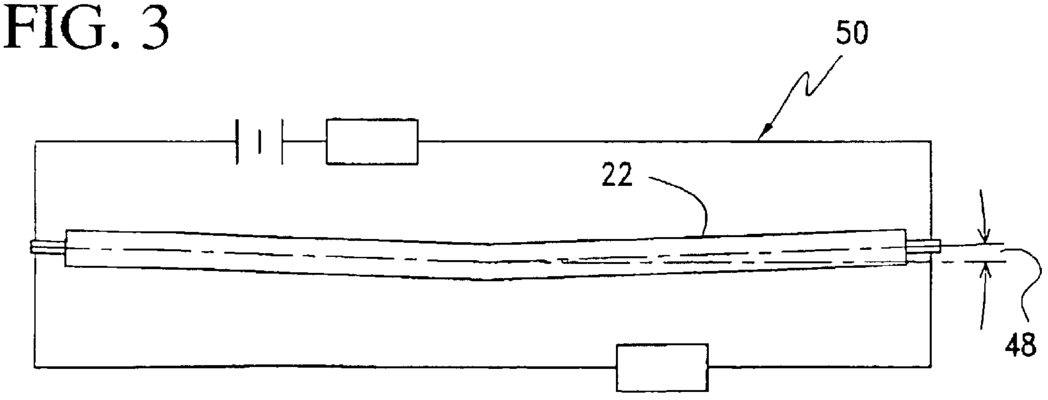

OVERCOAT APPLICATION PEEL APPARATUS

FIELD OF THE INVENTION

The present invention relates in general to an apparatus that utilizes a lamination process to transfer an overcoat from donor support to printed media. More particularly, this invention relates to an overcoat application peel apparatus for use in the lamination process done such that the donor support can be separated or peeled from the printed media leaving an overcoat behind on the printed media.

BACKGROUND OF THE INVENTION

Durability of photographic and near photographic images has become a feature that has grown in demand in recent years. Current commercial means of improving durability include lamination with a clear adhesive liquid laminate material or coating (via spray or liquid application) with a liquid that dries to a clear protective layer. Another lamination process known as "peel apart" lamination has been demonstrated for diffusion transfer images.

The focus of this particular invention is the peel apparatus used in the peel-apart thermal transfer lamination process. This technique transfers an overcoat material from a donor support to a printed image. This transfer is often done through a process in which the donor support with the overcoat and the printed media are brought together mechanically with pressure and then heat is applied for a specific exposure time period. This process causes the overcoat material to transfer from the donor to the printed image, so that the donor can then be peeled away.

One example of this technique uses a heated fuser and a platen to sandwich or press the donor support with overcoat and the printed media together in a mechanical nip. The donor support with overcoat and the printed media are then transported at a constant rate of speed between the heated fuser and the platen such that the exposure time and temperature are controlled. While in the nip, the thermal energy from the heated fuser causes the transfer to take place. The composite laminate carrying donor support, overcoat, and printed media are then transported and manipulated to separate the donor support from the printed media and its new overcoat layer.

The donor support and the overcoated printed media can not be easily separated directly upon exiting the nip of the heated fuser and platen. This is usually due to the fact that the overcoat material is in a phase state that does not allow it to have an adhesion affinity for the printed media that is greater than its affinity for the donor support. Therefore, a curing time must be allowed and a separation or peeling process must occur downstream of the nip. This separation or peeling mechanism is usually designed to maximize the following functional requirements:

a) The overcoat remains uniformly applied to the printed media.

b) No contamination is generated in the form of bits of unused or non-adhered overcoat.

c) No donor support or media transport jams are generated.

d) The process works over a wide range of printed media sizes and types, donor support and overcoat material types, and equipment settings.

Mechanisms designed to meet these requirements can be found in a multitude of patents and in practice. For example, in U.S. Pat. No. 5,658,416, MacCollum et al. describes a method and apparatus that uses a number of means for performing a peel of a laminate from another donor. The basic mechanism is one in which the separation of laminate carrying donor is done using a vacuum in conjunction with a peel angle. In addition, a beater blade is used near the separation point to aid the separation by introducing pulsating forces to the laminate carrying donors. In U.S Pat. No. 5,643,392, Clough describes a method in which tension control and a peel angle are used to separate laminate carrying donors. Schulte, Goodwin et al., and Mistyrik in U.S Pat. Nos. 5,820,277, 5,788,384, and 6,053,648 discuss other tension control means, respectively. Mistryrik describes a bowed plate for improved transport performance of the laminate carrying donors. Miyashita in U.S. Pat. No. 4,420,152 in which pawls are used to separate then laminate carrying donors describes another means. Finally, Pickering et al. describes in U.S. Pat. No. 5,499,880 a donor guide that has a similar function to the peel bar already described.

An example of the process in practice can be found in the Kodak Picture Maker. The Kodak Picture Maker is a commercial printer that uses a thermal dye diffusion to transfer both dye and a protective overcoat to printed media. Specifically, this printing process is one in which dye is transferred from a donor ribbon to media by means of heating a thermal printhead (instead of a fuser) while the printhead, donor ribbon and media are in mechanical contact. By performing this process in a serial fashion for three separate primary color patches (sometimes there is a fourth black patch) in a controlled manner, an image can be produced on the media. To ensure durability, this printing process is performed one more time except that instead of dye transfer, a continuous clear overcoat material is transferred to the media. The mechanism used to separate the donor support from the overcoated printed media is a peel bar. It is located downstream of the nip and is simply a mechanical feature the is used to define the geometric line along which the donor support is directed to a donor take-up reel and the overcoated printed media is directed toward the exit of the printer. The distance between the nip and the peel bar is critical in that it provides the curing time required performing a clean peeling action.

In the above cases, the base means for performing the peeling relies-on controlling the distance between the fuser and the peel bar or requires a peeling mechanism to aid the peel bar. These mechanisms can be expensive, and difficult to put and keep in position. In addition the prior art devices are not efficient causing lost hours and additional costs due to downtime. Finally many of these devices cause machine failures leading to expensive machine downtime and repairs.

Therefore there is a need for an improved peeler device that is low cost and effective for a wide range of printing processes and peel-apart materials. The intention of the invention is to describe a mechanism that meets these needs.

SUMMARY OF THE INVENTION

An object of the present invention is to provide an overcoat application process in which an overcoat material is transferred from a donor support to a printed image.

Another object of the invention is to provide a means by which the donor support and the printed image with an overcoat are separated or peeled apart in a controlled fashion such that the overcoat material remains uniformly applied to the printed image.

Yet another object of the invention is to provide a means by which the donor support and the printed image with an overcoat are separated or peeled apart in a controlled fashion such that no contamination is generated by the peeling action.

A further object of the invention is to provide a means by which the donor support and the printed image with an overcoat are separated or peeled apart in a controlled fashion such that the donor support and the printed image with an overcoat do not cause a transport jam.

A still further object of the invention is to provide a means in which the donor support and the printed image with an overcoat are separated or peeled apart in a controlled fashion such that the overall process has the ability to handle a wide variety of donor support, overcoat, and image material types and sizes within a specific equipment design.

In accordance with a further aspect of the present invention, there is provided an apparatus for performing the peeling process to separate the donor support from the overcoated printed media for use in the lamination process.

The apparatus including a first peel guide, a second peel guide adjacent the first peel guide and can also include a donor guide and a tilted platen.

The novel aspects of the invention are set forth with particularity in the appended claims. The above and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which:

FIG. 1 is mechanical schematic diagram of an overcoat application mechanism in accordance with the invention;

FIG. 2 is a detailed isometric view of a portion of the overcoat application peel apparatus;

FIG. 3 is a side view of a portion of the overcoat application peel apparatus showing the thermal system;

DETAILED DESCRIPTION OF THE INVENTION

Figure 4:
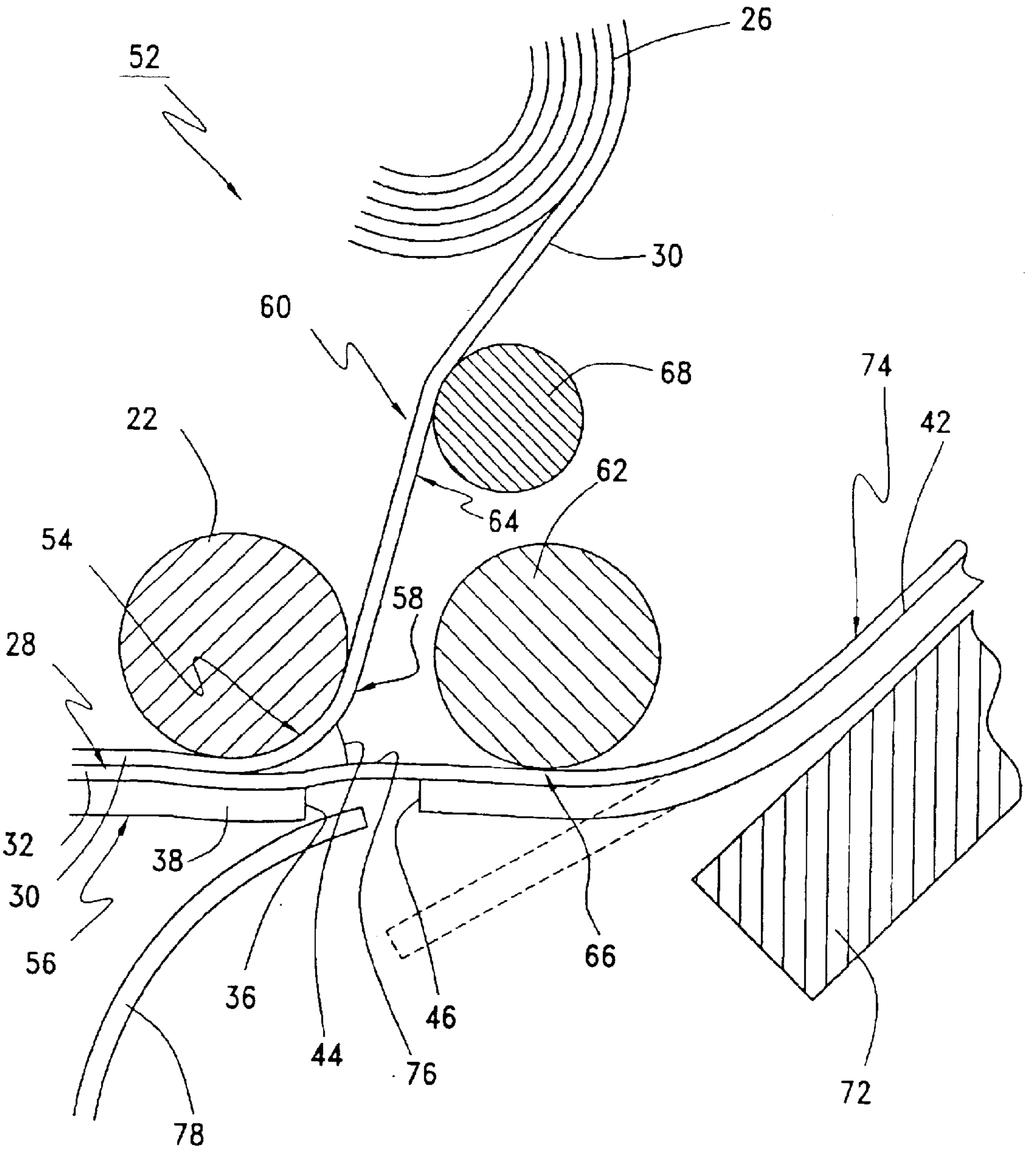
FIG. 4 is detailed isometric view of the overcoat application peel apparatus

The present description will be directed in particular to elements forming part of, or in cooperation more directly with, the apparatus in accordance with the present invention. It is understood that elements not specifically shown or described may take various forms well known to those skilled in the art.

Referring now to the drawings, like reference numerals represent similar or corresponding parts throughout the several views. FIG. 1 is a mechanical schematic diagram of an overcoat application apparatus 10. The overcoat application apparatus 10 consists of an entry roller 12, a donor supply reel 14, a donor guide bar 16, a heated fuser roller 18, a pressure roller 20, a primary peel bar 22, an exit roller 24 and a donor take-up reel 26.

The basic function of the overcoat application apparatus 10 is described as follows. Again using FIG. 1 as reference, a laminate carrying donor 28 is threaded between the donor supply reel 14 and the donor take-up reel 26. The donor is preferably a multi-layer web that in its simplest form consists of a donor support hereafter referred to as a donor 30 and an overcoat material hereafter referred to as a laminate 32. The threading is such that the laminate carrying donor 28 follows a path around the donor guide bar 16, through a nip 34 created by the heated fuser roller 18 and the pressure roller 20, and around the first peel guide 22. In a normal idle mode, the fuser roller 18 is disengaged from the pressure roller 20 so that no transport of laminate carrying donor 28 is performed.

When the overcoat application process is ready to be performed, the pressure roller 20 is pressed against the heated fuser roller 18. Simultaneously, the heated fuser roller 18 is rotated, preferably at a constant speed thus transporting the laminate carrying donor 28 through the nip 34. Tension control on both the donor supply reel 14 and donor take-up reel 26 allow this donor transport to be done in a controlled fashion. In addition to all of these events, a sheet or a continuous roll of printed media 38 is fed onto the entry roller 12 such that a leading edge 36 of a printed media 38 enters the nip 34 along with the laminate carrying donor 28.

At this point, thermal energy from the heated fuser roller 18 is transferred into the portion of the laminate carrying donor 28 and printed media 38 that are in the nip 34. The length of thermal energy exposure time and the amount of thermal energy transferred to the laminate carrying donor 28 and the printed media 38 are a function of the transport speed created by the rotation of the heated fuser roller 18 and the width of the nip 34 and the temperature and thermal characteristics of the fuser roller 18, the laminate carrying donor 28, overcoat material, also known as laminate 32, the printed media 38, and the pressure roller 20. During this exposure time, the laminate carrying donor 28 and printed media 38 are fused together. The fused composite continues until encountering the first peel guide 22. The distance between the nip 34 and the first apex of the first peel guide 22 is referred to as the cooling distance 40.

FIG. 2 shows the donor 30 is directed to the donor take-up reel 26 at an angle preferably approaching 90 degrees while a laminated printed article, hereafter referred to as a laminated printed media 42, is directed to the exit roller 24. It should be noted that the article to be laminated may include other items such as clothing, as is well known in the art. The angle between these redirections is referred to as the peel angle 44. The goal of this redirection is to accomplish the following functional requirements:

a) The overcoat material 32 is completely transferred from the donor 30 to the printed media 38 such that a completely uniform coating is produced.

b) No contamination is generated.

c) No laminate carrying donor 28 or printed media 38 transport jams are generated from the excess lamination material, generally called flash, at the trailing edge 46 of the laminated printed article.

d) The process works over a wide range of printed media 38 sizes and types, donor 30 and laminate 32 sizes and types, and various settings and configurations of the overcoat application apparatus 10.

Up to this point, the process that has been described is similar to the normal practice. The Kodak Picture Maker example discussed in the background section is an example of this practice other than the fact that a thermal printhead is used to perform the fusing process instead of a heated fuser roller 18.

FIG. 3 shows a front view of the first peel guide of the first peel guide 22 and illustrates the first peel guide curvature 48 and a first peel guide peel bar wrap angle, geometric features of the overcoat application apparatus 10 associated with the peeling process.

FIG. 3 also shows a peel guide thermal system 50 capable of controlling the temperature after the laminated printed media exits the fuser, in this case by controlling the temperature of the area upstream of first peel guide using a fan. The thermal system could also control the temperature of the first peel guide, platen or other devices in contact with the laminated printed media.

One way that the thermal system 50 can control the temperature of the laminated printed media is by using a temperature reference signal that provides a control signal to a comparator. The comparator takes the temperature reference signal and subtracts a temperature feedback signal that results in a temperature error signal. The temperature error signal is then fed into a controller that in turn produces a temperature control signal. This temperature control signal is then used to drive a thermal device. The thermal device in turn heats or cools portions of the overcoat application peel apparatus 10. A temperature sensor senses the first peel guide temperature and converts it into the temperature feedback signal. The intent of the control loop is to keep the first peel guide temperature at a level equivalent with the temperature reference signal. The current preferred method of thermal control is to cool the laminated printed media after it is heated to between 90–115 degree Celsius down to below 60 degree Celsius. This is accomplished with the aid of one or more of the following cooling methods: a) conduction, using a metal in contact with the laminated printed media, b)conrvection, using a fan or similar device and c)radiation.

FIG. 4 shows the overcoat application peel apparatus 52 of the present invention for maintaining a peel angle 44 at a peel point 54 where a donor 30 is peeled from a laminated printed article 42 between a first paper path 56 downstream a fuser roller 18 and a donor path 58 upstream a donor take-up reel 26, where the first peel guide 22 is adjacent the first paper path 56 on a first side 60 of the donor and a second peel guide 62 is adjacent the first peel guide 22 on a second side 64 of the donor such that the second peel guide 62 supports the printed media 42 at a support point 66. A donor guide 68 adjacent the donor path 58 on the second side of the donor 64 such that the donor guide 68 resists tension from the donor take-up reel 26 thus maintaining a substantially constant peel angle 44 as the donor take-up reel 26 changes in diameter.

Figure 5:
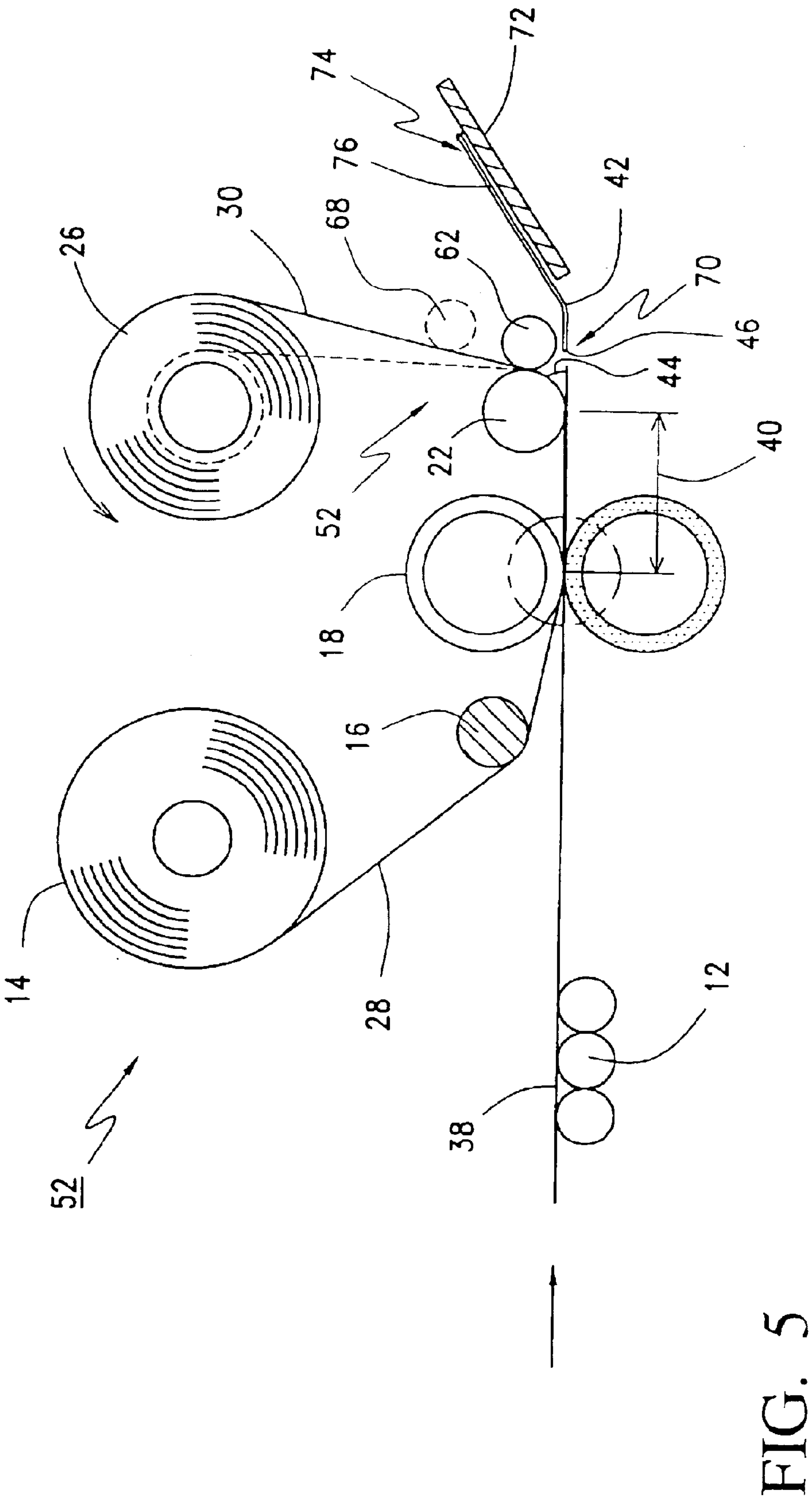
FIG. 5 is a view of the overcoat application peel apparatus.

FIG. 5 shows the overcoat application peel apparatus 52 where the first peel guide 22 is adjacent the second peel guide 62 forming a peel nip 70 where the donor 30 is trained through the peel nip 70. The overcoat application peel apparatus 52 can also include a tilted take-up platen 72 arranged upstream of the second peel guide 62 along a second paper path 74 for the laminated printed article 42 including interstitial laminate 76, commonly referred to as flash. The angle of the tilted take-up platen 72 should be sufficient to release the interstitial laminate 76 from the laminated printed article 42 at a media trailing edge 46.

Figure 6:
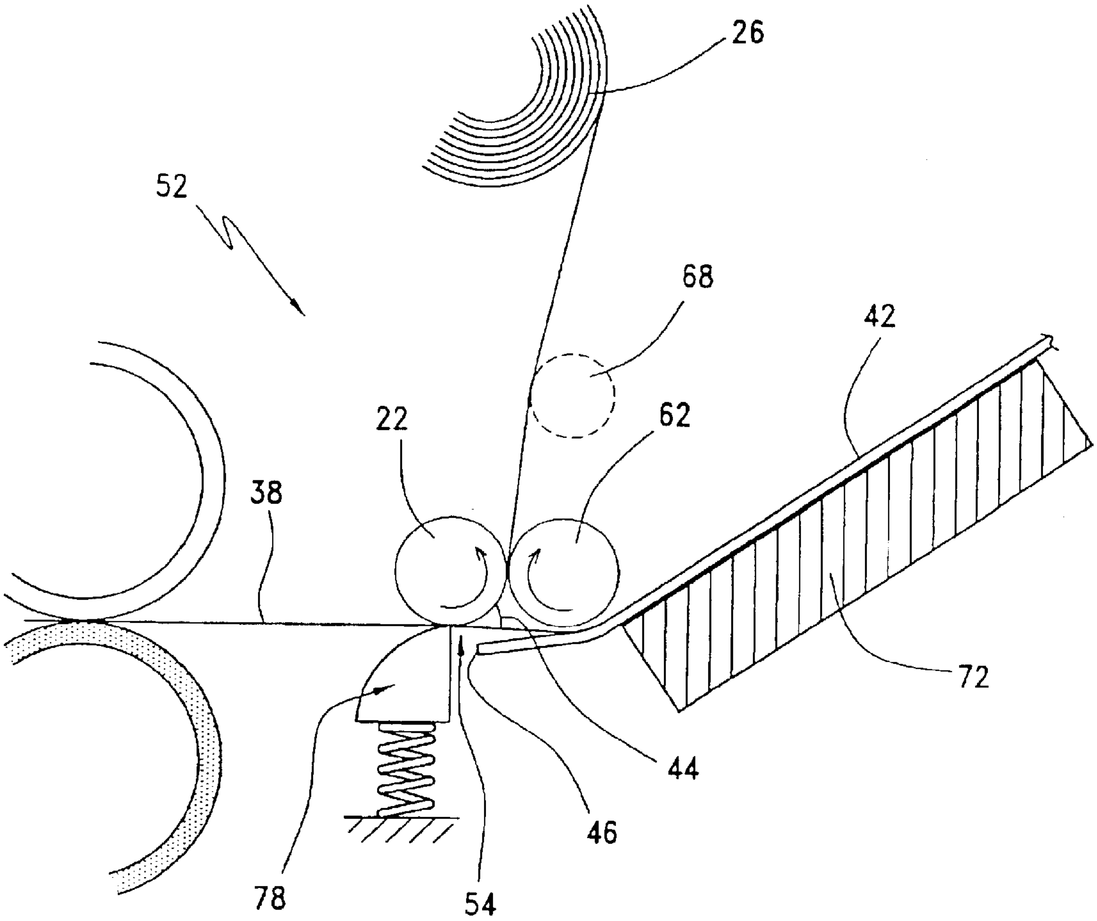
FIG. 6 is a detailed isometric view of an overcoat application peel apparatus showing the flex spring.

FIG. 6 shows the overcoat application peel apparatus 52 including a paper support 78 that is adjacent the printed media 42 proximate the peel point 54 to support the printed media 38. The overcoat application peel apparatus 52 can be built with the paper support 78 including a curve spring or other similar device that would also cause the printed media 38 to flex. The first and second guides may be stationary bars, stationary rollers, or energized rollers as is that is well known by one skilled in the art.

The first peel guide 22 and the second peel guide 62 act in concert to cause the unused laminate to be effectively removed from the trailing edge 46 as it moves through the overcoat application apparatus 10. This removal process may be enhanced by reversing the direction of the laminated printed media 42 and/or coordinated by the use of a sensor that detects the trailing edge 46 of the laminated printed media 42 before it passes the first peel guide 22. The first peel guide 22 and second peel guide 62 of the overcoat application peel apparatus 52 may be tapered. It has been found that a tapered guide more effectively removes the unused laminate from the sides of the laminated printed media 42. This is especially important when the laminated printed media is inbound, that is the media is slightly smaller in size than the laminate used to coat the printed media 38. Inbound printed media is a product designed to use the complete surface of the printed media 38. This is in contrast to other printing processes that leave an edge of unlaminated printed media, referred to as outbound media.

In addition to significantly improving the peeling parameters, other advantages are achieved with the use of the overcoat application peel apparatus 52. First the overcoat application peel apparatus 52 helps flatten the laminated media 42 and thus reduces buckling as discussed above. Secondly the overcoat application peel apparatus helps to eliminate the normally tight tolerances on the design distances. For example, it has been shown that if the overcoat application peel apparatus 52 is located a reasonable distance (>1 inch) from the nip 34, there is a significantly wide window of peel bar parameters that allow an excellent peeling process. This allows a wider range of materials and equipment tolerance as well as the set point designs for the geometric parameters of the system. Also the overcoat application peel apparatus 52 improves the functionality of the overcoat application apparatus by helping tighten the laminate-carrying donor 28 for stable transport control. This in turn helps assure uniform coating of the printed media 38.

The invention has been described in detail with particular reference to certain preferred embodiments thereof, but it will be understood that variations and modifications can be effected within the spirit and scope of the invention.

What is claimed is:

1. An overcoat application peel apparatus for peeling a donor from a laminated printed media, comprising:

a) a support for conveying a plurality of attached laminated printed articles along a first paper path, the articles comprising at least partially resilient printed media, a layer of laminate on the article, and a removable donor on the layer of laminate;

b) peel guide means for guiding the donor to a donor take-up reel, the peel guide means positioned with respect to the first paper path and the donor take-up reel so that the peel angle between the donor and the laminated printed media as the donor leaves the printed media remains substantially constant as the donor take-up reel fills with donor and changes the angle at which the donor leaves the peel guide; and c) an exit platen located downstream of where the donor leaves the printed media and at an upwardly tilted angle with respect to the first paper path, the exit platen being disposed to direct the printed media upwardly with respect to the first paper path to promote the release of the laminate from the printed media at the trailing edge of the printed media as the trailing edge passes the peel guide means.

2. An overcoat application peel apparatus for peeling a donor from a laminated printed media, comprising:

a) a support for conveying a plurality of attached laminated printed articles along a first paper path, the articles comprising at least partially resilient printed media, a layer of laminate on the article, and a removable donor on the layer of laminate;

b) a peel guide for guiding the donor to a donor take-up reel, the peel guide positioned with respect to the first paper path and the donor take-up reel so that the angle between the donor and the laminated printed media remains substantially constant as the donor take-up reel fills with donor and changes the angle at which the donor leaves the peel guide;

c) an exit platen; and d) a second peel guide disposed adjacent to the first paper path and sufficiently close to the exit platen so that the laminated printed media resiliently bends around the second peel guide and releases the laminated printed media at a trailing edge of the article downstream the first peel guide.

3. The overcoat application peel apparatus of claim 2 in which the exit platen is disposed at an upwardly tilted angle with respect to the second peel guide such that the laminated printed media bends around the second peel guide.

4. The overcoat application peel apparatus of claim 2 further comprising a paper support adjacent the printed media at a media lead edge proximate the first peel guide to support the printed media.

5. The overcoat application peel apparatus of claim 4 wherein the paper support further comprises a curve spring.

6. The overcoat application peel apparatus of claim 5 wherein the primary guide has a guide length perpendicular to the first paper path, the primary guide including a guide edge, a guide center, and a guide diameter that varies with the guide length.

7. The overcoat application peel apparatus of claim 6 such that the guide diameter is less at the guide edge than at the guide center.

8. An overcoat application peel apparatus for peeling a donor from a laminated printed media, comprising:

a) a support for conveying a plurality of attached laminated printed articles along a first paper path, the articles comprising at least partially resilient printed media, a layer of laminate on the article, and a removable donor on the layer of laminate;

b) an exit platen disposed at an angle to the first paper path and downstream of the first paper path;

c) a peel guide for guiding the removable donor to a donor take-up reel, the peel guide positioned with respect to the first paper path and the donor take-up reel so that the angle between the donor and the laminated printed media remains substantially constant as the donor take-up reel fills with donor and changes the angle at which the donor leaves the peel guide; and d) a paper support comprising a curved spring adjacent the printed media at a media lead edge proximate the peel guide to support the printed media.

9. The overcoat application peel apparatus of claim 8 wherein the peel guide has a guide length perpendicular to the first paper path, the peel guide including a guide edge, a guide center, and a guide diameter that varies with the guide length.

10. The overcoat application peel apparatus of claim 9 such that the guide diameter is less at the guide edge than at the guide center.

11. An overcoat application apparatus comprising:

a) an entry roller for accepting printed media from a printer;

b) a donor supply reel to supply a laminate carrying donor comprising a laminate and a donor;

c) a heated fuser guide to apply heat to the laminate carrying donor and the printed media;

d) a pressure guide engaging the fuser guide in order to produce a mechanical nip;

e) a donor guide that guides the laminate carrying donor into the nip formed by the heated fuser guide and the pressure guide;

f) an overcoat application peel apparatus for peeling a donor from a laminated printed media, comprising:

(i) a support for conveying a plurality of attached laminated printed articles along a first paper path, the articles comprising at least partially resilient printed media, a layer of laminate on the article, and a removable donor on the layer of laminate; and (ii) a peel guide for guiding the donor to a donor take-up reel, the peel guide positioned with respect to the first paper path and the donor take-up reel so that the angle between the donor and the laminated printed media remains substantially constant as the donor take-up reel fills with donor and changes the angle at which the donor leaves the peel guide;

g) an exit roller which accepts the overcoated printed material and transports it to the next required process station; and h) a second peel guide disposed adjacent to the first paper path and sufficiently close to an exit platen so that the laminated printed media resiliently bends around the second peel guide and releases the laminated printed media at a trailing edge of the article downstream the first peel guide.

12. The overcoat application apparatus of claim 11 in which the exit platen is disposed at an upwardly tilted angle with respect to the second peel guide such that the laminated printed media bends around the second peel guide.

13. The overcoat application apparatus of claim 11 further comprising a paper support adjacent the printed media at a media lead edge proximate the first peel guide to support the printed media.

14. The overcoat application apparatus of claim 13 wherein the paper support further comprises a curve spring.

15. The overcoat application apparatus of claim 14 wherein the primary guide has a guide length perpendicular to the first paper path, the primary guide including a guide edge, a guide center, and a guide diameter that varies with the guide length.

16. The overcoat application apparatus of claim 15 such that the guide diameter is less at the guide edge than at the guide center.

* * * * *